United States Patent
Li et al.

(10) Patent No.: US 10,699,100 B2
(45) Date of Patent: Jun. 30, 2020

(54) METHOD FOR MICROSCOPIC IMAGE ACQUISITION BASED ON SEQUENTIAL SECTION

(71) Applicant: Institute of Automation, Chinese Academy of Sciences, Beijing (CN)

(72) Inventors: Guoqing Li, Beijing (CN); Hongtu Ma, Beijing (CN); Hua Han, Beijing (CN); Lixin Wei, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 135 days.

(21) Appl. No.: 16/066,879

(22) PCT Filed: Nov. 7, 2016

(86) PCT No.: PCT/CN2016/104852
§ 371 (c)(1),
(2) Date: Jun. 28, 2018

(87) PCT Pub. No.: WO2018/082085
PCT Pub. Date: May 11, 2018

(65) Prior Publication Data
US 2019/0012520 A1  Jan. 10, 2019

(51) Int. Cl.
*G06K 9/00* (2006.01)
*G06K 9/62* (2006.01)
*G06K 9/68* (2006.01)

(52) U.S. Cl.
CPC ....... *G06K 9/00134* (2013.01); *G06K 9/0014* (2013.01); *G06K 9/6206* (2013.01);
(Continued)

(58) Field of Classification Search
CPC ............. G06K 9/00147; G06K 9/6857; G06K 9/6257; G06K 9/0014; G06K 9/6206
See application file for complete search history.

(56) References Cited

U.S. PATENT DOCUMENTS 6,606,413 B1  8/2003 Zeineh

FOREIGN PATENT DOCUMENTS

| CN | 101706458 A | 5/2010 |
| CN | 101788709 A | 7/2010 |

(Continued)

OTHER PUBLICATIONS

International Search Report and Written Opinion dated Aug. 8, 2017 and Response to the Written Opinion of corresponding International application No. PCT/CN2016/104852; 6 pgs.
(Continued)

*Primary Examiner* — Sam Bhattacharya
(74) *Attorney, Agent, or Firm* — Maier & Maier, PLLC

(57) ABSTRACT

A method for microscopic image acquisition based on a sequential slice. The method includes: acquiring a sample of the sequential slice and a navigation image thereof; identifying and labeling the sample of the sequential slice in the navigation image by utilizing methods of image processing and machine learning; placing the sample of the sequential slice in a microscope, establishing a coordinate transformation matrix for a navigation image-microscope actual sampling space coordinate, and navigating and locating a random pixel point in the navigation image to a center of the microscope's visual field; locating the sample of the sequential slice under a low resolution visual field, binding a sample acquisition parameter; based on the binding of the sample acquisition parameter, recording a relationship of relative of locations between a center point of a high resolution acquisition region and a center point after being matched with a sample template.

9 Claims, 1 Drawing Sheet

(52) U.S. Cl.
CPC .......... *G06K 9/6211* (2013.01); *G06K 9/6257* (2013.01); *G06K 9/6857* (2013.01); *G06K 9/00147* (2013.01); *G06K 9/6262* (2013.01); *G06K 9/6269* (2013.01)

(56) References Cited

FOREIGN PATENT DOCUMENTS

| CN | 102436551 A | 5/2012 |
|---|---|---|
| CN | 103020631 A | 4/2013 |
| CN | 103577038 A | 2/2014 |
| CN | 106570484 A | 4/2017 |

OTHER PUBLICATIONS

Nie, Xiong et al., "Research on the Method of Auto-Collecting Serial Optical Section for Digital Confocal Microscope", Chinese Journal of Scientific Instrument, 6 pgs.

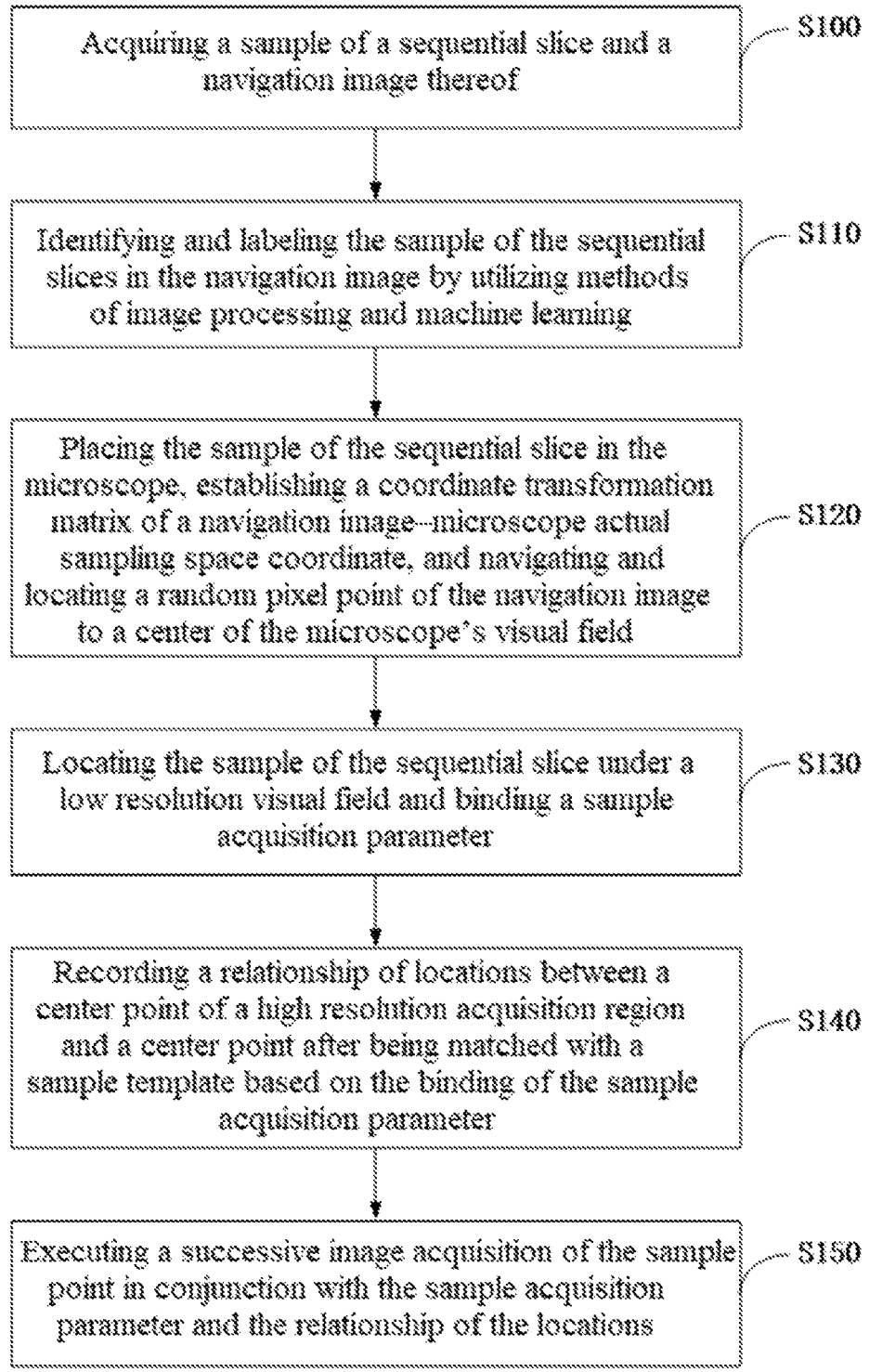

METHOD FOR MICROSCOPIC IMAGE ACQUISITION BASED ON SEQUENTIAL SECTION

TECHNICAL FIELD

The present application relates to the technical field of imaging, and in particular to a method for microscopic image acquisition based on a sequential slice.

BACKGROUND

The technology of 3-dimensional imaging for ultrathin sequential slices refers to a technique for slicing a biological tissue into ultrathin sequential sections or slices, and using an electron microscope for imaging them one by one; according to different techniques for slicing, the technology is mainly classified into two types, sequential sections imaging and sequential slices imaging: (1) the manner of sequential sections imaging is accomplished by combining slicing with imaging in the sample chamber of an electron microscope, this type of method has a close resolution horizontally and vertically, and is provided with isotropy, whereas the disadvantages lies in the destructive manner of slicing, once a defection is found to appear in data, it will not be able to restore, which is adverse for performing massive reconstruction; (2) the manner of imaging for sequential slices uses an ultrathin slicing apparatus to slice the sample into sequential slices, and the sequential slices are placed into the electron microscope for imaging after collected with appropriate hydrophilic substrates.

The sequential slices may be automatically collected by an automatic slice collector or may be manually collected; the technique of automatic collecting is constantly evolving, which has advantages of uniform density in slice collection, economizing manpower, etc.; however, there are disadvantages such as unstable quality of slice collections, low space utilization rate of sample slices. At present, most slices are manually collected and placed on the carrier rack, where manual collection has advantages of high speed, flexible schemes, and mature technique in slice collection; however, manual collection also has disadvantages such as large distribution density of slices, inconsistent azimuth angle in slice collection, as shown in FIG. 1. Presently, automatic acquisition of microscopic images specific to sequential slices is a challenging problem that requires to be solved.

To this end, the present application is provided hereby.

SUMMARY

The embodiments of the present application provides a method for microscopic image acquisition based on a sequential slice, to solve the technical problem of how to effectively accomplish automatic acquisition of the image of an interested sample region.

To achieve the above objects, the following technical solution is provided:

a method for microscopic image acquisition based on a sequential slice, comprising:

acquiring a sample of a sequential slice and a navigation image of the sequential slice;

identifying and labeling the sample of the sequential slice in the navigation image by utilizing methods of image processing and machine learning;

placing the sample of the sequential slice in a microscope, establishing a coordinate transformation matrix for a navigation image-microscope actual sampling space coordinate, navigating and locating a random pixel point in the navigation image to a center of the microscope's visual field;

locating the sample of the sequential slice under a low resolution visual field, and binding a sample acquisition parameter;

based on the binding of the sample acquisition parameter, recording a relative relationship of locations between a center point of a high resolution acquisition region and a center point after being matched with a sample template;

executing successive acquisition for images of sample points, in conjunction with the sample acquisition parameter and the relative relationship of the locations.

Preferably, the identifying and labeling the sample of the sequential slice in the navigation image by utilizing methods of image processing and machine learning, particularly comprise:

segmenting the navigation image by using a Mean-Shift algorithm, to obtain a foreground sample target region and a background region;

calculating a minimum enclosing rectangle of an outline of an edge of the foreground sample target region and the background region;

comparing the minimum enclosing rectangle of the outlines of the edge of the foreground sample target region and the background region with a minimum enclosing rectangle of the sample template, filtering out a foreground sample target region and the background region where a disparity of a width to length ratio and an area size are relatively large;

determining the following activation function:

$$y = e^{-\left(\frac{s_i^2}{W} + \frac{S_i^2}{B_i^2}\right)}$$

wherein, the y represents an activation function; the $S_i$ represents an Euclidean distance of a characteristic value of a sliding window region, where the $S_i = \|(\mu_i, \sigma_i) - (\mu_1, \sigma_1)\|$; the $B_i$ represents an Euclidean distance of a characteristic value of a sample, where the $B_i = \|(\mu_i, \sigma_i) - (\mu_2, \sigma_2)\|$; the $\mu_1$ represents a mean value of a sample target region; the $\sigma_1$ represents a variance of the sample target region; the $\mu_2$ represents a mean value of a non-sample background region; the $\sigma_2$ represents a variance of the non-sample background region; the $\mu_i$ represents a mean value of the sliding window region; the $\sigma_i$ represents a variance in the sliding window region; the W represents a weight;

executing a threshold segmentation for a result of the activation function, to determine a location of a positive sample in the navigation image;

cutting out the navigation image by taking the location of the positive sample in the navigation image as a center point, to obtain a training set of the positive sample, and acquiring an image of a region which does not include a slice peripheral to a location of the positive sample in the navigation image, to obtain a training set of a negative sample;

normalizing the training set of the positive sample and the training set of the negative sample, and extracting a HOG characteristic;

utilizing an SVM classifier to detect the navigation image, and obtaining a location of the sample slice;

merging the minimum enclosing rectangle obtained by cutting out with the location of the sample slice, to accomplish identifying and labeling of the sample of the sequential slice.

Preferably, the acquiring an image of a region which does not include a slice peripheral to a location of the positive sample in the navigation image, to obtain a training set of a negative sample, particularly comprises:

applying rotation, random noise superimposition, blur and gamma transform to the image of the region which does not include the slice peripheral to the location of the positive samples in the navigation image, to obtain the training set of the negative sample.

Preferably, the placing the sample of the sequential slice in the microscope, establishing a coordinate transformation matrix for the navigation image-microscope actually sampling space coordinate, navigating and locating a random pixel point in the navigation image to the center of the microscope's visual field, particularly comprises:

selecting any three points in the navigation image that are not on a same straight line, and recording a location of pixel coordinate of the three points in the navigation image;

determining a position of a carrier rack of the microscope when the three points are in a center of imaging;

based on the location of pixel coordinates of the three points in the navigation image and the position of the carrier rack of the microscope when the three points are in the center of imaging, establishing a coordinate transformation matrix for the navigation image-microscope actually sampling space coordinate, according to a method for affine transformation of space coordinates;

utilizing the coordinate transformation matrix, to project a random pixel point in the navigation image onto a corresponding position in the visual field of the microscope, so as to locate a random pixel point of the navigation image to a center of the microscope's visual field.

Preferably, the locating the sample of the sequential slice under a low resolution visual field, and binding a sample acquisition parameter, particularly comprises:

setting up a clarified imaging parameter under a high resolution, and taking a clarified imaging image under a low resolution that has been Gauss blurred as a sample template, and establishing a sample database based on a clarified imaging parameter under a low resolution and the sample template;

navigating the microscope to a corresponding sample point in sequence, and binding a sample acquisition parameter in conjunction with the sample database.

Preferably, the navigating the microscope to a corresponding sample point in sequence, and binding a sample acquisition parameter in conjunction with the sample database, particularly comprises:

determining a location of a center point of a multi-dimensional, the multi-perspective template matching, and storing the location of the center point of the multi-dimensional, multi-perspective template matching into the sample database;

moving the center of the microscope's visual field to a location of a sample of the sequential slice in the coordinate system of the microscope, and quickly scanning a photographed image, and using a Newton quadratic interpolation to approach a local optimal value of a image quality for the scanned photographed image, to obtain a clarified imaging parameter approximating to a present parameter;

executing parameter binding for the clarified imaging parameter, based on the sample database.

Preferably, the determining a location of a center point of a multi-dimensional, multi-perspective template matching, particularly comprises:

calculating a image pyramids for the sample template and a scan image to be searched;

setting up a range of a rotation angle, a coarse angle and an interval of the coarse angle, and a fine angle and an interval of the fine angle;

rotating the scan image to be searched with the coarse angle and the fine angle, and specific to a top level of the image pyramid, executing a normalized mutual correlation computation for a rotated image and the sample template, to determine the best point of match;

taking a point in a present layer corresponding to the best point of match in an upper layer as a center of one sub-region, executing the normalized mutual correlation computation for the rotated image and the sample template, determining the best point of match in a bottommost layer of the image pyramid as a location of the center point of the multi-dimensional, multi-perspective template matching.

Preferably, the obtaining a clarified imaging parameter approximating to a present parameter, particularly comprises:

utilizing a discretized Gauss convolution kernel to convolve the scanned photographed image, to obtain an output image;

executing a Gauss differential computation for the output image;

convolving a mean convolution kernel with a result of the Gauss differential computation, to obtain a convolution result;

applying threshold cutoff to the convolution result, to obtain a cutoff result;

based on the cutoff result, calculating an evaluation value of image quality according to the following equation:

$$\text{Value} = \frac{\text{Sum}(Img_{th})}{W(Img_{th}) \times H(Img_{th})}$$

wherein, the Value represents a evaluation value of image quality; the $Img_{th}$ represents a cutoff result; the $\text{Sum}(Img_{th})$ represents a summation of pixels of the cutoff result; the $W(Img_{th})$ represents a width of the cutoff result; the $H(Img_{th})$ represents a height of the cutoff result;

taking the evaluation value of image quality as a relative calculated value of a clearness under a present scan parameters, and employing a local optimal algorithm to approach the local optimal value, to obtain the clarified imaging parameter gradually approximate to the present parameters.

Preferably, the executing successive acquisition for images of sample point, in conjunction with the sample acquisition parameter and the relative relationship of the locations, particularly comprises:

reading a sample acquisition parameter;

moving the center of the microscope's visual field to a location that requires for high resolution imaging, and setting a scan deflection angle;

adjusting a imaging parameter;

back calculating multi-region acquisition points into the actual coordinate system of the microscope with an affine transformation matrix;

moving the center of the microscope's visual field to the the actual coordinate system of the microscope, scanning a preset high resolution image point by point, to accomplish multi-region image acquisition for sample points;

outputting successive sample images, based on the multi-region image acquisition of each of the sample points.

Comparing to the prior art, the above technical solution may have the following beneficial effects:

The embodiment of the present application provides a method for microscopic image acquisition based on a sequential slice. The method comprises: acquiring a sample of the sequential slice and a navigation image thereof; identifying and labeling the sample of the sequential slice in the navigation image by utilizing methods of image processing and machine learning; placing the sample of the sequential slice in a microscope, establishing a coordinate transformation matrix for a navigation image-microscope actual sampling space coordinate, and navigating and locating a random pixel point in the navigation image to a center of the microscope's visual field; locating the sample of the sequential slice under a low resolution visual field, binding a sample acquisition parameter; based on the binding of the sample acquisition parameter, recording a relationship of relative of locations between a center point of a high resolution acquisition region and a center point after being matched with a sample template; executing successive acquisition for images of sample points, in conjunction with the sample acquisition parameter and the relative relationship of the locations. By means of this technical solution, the technical problem of how to effectively accomplish automatic acquisition for the images of an interested sample region is solved, automatically identifying the pixel coordinate of each sample of the slice in a complete navigation image is achieved, the center of the microscope's visual field is located to the location of each sample slice with the complete navigation image, and the rotation angle at the time of the slice collection of this sample is calculated, the clearness of microscopic scan image is rapidly judged, and automatic imaging of successive region under a microscope (electron or optical) with an automatically controlled interface is implemented for massive sequential samples, which is applicable for the microscopic 3D imaging of large range sequential samples (sections) after steric cutting; especially suitable for collecting sequential samples on a large area plane supporter (semiconductor dice), such as a 3 dimensions imaging technique for ultrathin sequential slices.

BRIEF DESCRIPTION OF DRAWINGS

FIG. 1 is a schematic flowchart of the method for microscopic image acquisition based on a sequential slice, according to an embodiment of the application.

DESCRIPTION OF EMBODIMENTS

The present application is explicated below in details, in conjunction with the appendant drawings and particular embodiments.

The automatic acquisition of a microscopic image specific to a sequential slice, an embodiment of the application provides a method for microscopic image acquisition based on a sequential slice, as shown in FIG. 1, the method may comprise: step S100 to step S150. Wherein:

S100: a sample of a sequential slice and a navigation image of the sequential slice are acquired.

The acquisition of the navigation image may be by means of completely photographing with an optical camera, or by means of photographing local images with a high resolution microscope and then stitching the local images together to obtain the complete navigation image.

S110: the sample of the sequential slice in the navigation image is identified and labeled by utilizing methods of image processing and machine learning.

A location of a coordinate point of each sample of the sequential slice in the navigation image is recorded in this step, and a precise location of each sample of the sequential slice in the navigation image is then able to be determined.

In particular, this step may comprise:

S111: the navigation image is segmented by using Mean-Shift algorithm, to obtain a foreground sample target region and a background region.

For example, the image may be segmented by utilizing a sliding window of N×N to successively slide over the entire navigation image, which is segmented into a foreground sample target region and a background region. Where, N represents a pixel unit; a stepping size may be set flexibly according to the actual sample, which is, preferably, N/9 (rounding).

S112: the minimum enclosing rectangle of an outline of edge of the foreground sample target region and an outline of edge of the background region is calculated.

The minimum enclosing rectangle of the outlines may be calculated by the method, for example, first the region is binarized, and then the binarized image is operated by a Laplacian operator, and finally points with the maximum value are successively connected, so as to obtain the minimum enclosing rectangle.

S113: the minimum enclosing rectangle of the outlines of edge of the foreground sample target region and the background region is compared with the minimum enclosing rectangle of a sample template, the foreground sample target region and the background region where a disparity of a width to length ratio and an area size is relatively large is filtered out.

An acceptable error range in this step is 10%.

S114: the following activation function is determined:

$$y = e^{-\left(\frac{S_i^2}{W} + \frac{S_i^2}{B_i^2}\right)}$$

wherein, y represents an activation function; $S_i$ represents an Euclidean distance of a characteristic value of a sliding window region, where $S_i = \|(\mu_i, \sigma_i) - (\mu_1, \sigma_1)\|$; $B_i$ represents an Euclidean distance of a characteristic value of the sample, where $B_i = \|(\mu_i, \sigma_i) - (\mu_2, \sigma_2)\|$; $\mu_1$ represents a mean value of a sample target region; $\sigma_1$ represents a variance of the sample target region; $\mu_2$ represents a mean value of a non-sample background region; $\sigma_2$ represents a variance of the non-sample background region; $\mu_i$ represents a mean value of a sliding window region; $\sigma_i$ represents a variance in the sliding window region; W represents a weight, for adjusting weights of two terms of a summation formula, where W is, preferably, 500.

The mean value and the variance of the sample target region and non-sample background region (the characteristic value of the sample) may be obtained by inputting a navigation image, selecting a sample template, and then executing sampling and statistics for the selected sample template slices.

S115: threshold segmentation is executed to a result of an activation function, a location of a positive sample in the navigation image is determined.

Where, exemplarily, the threshold segmentation may be executed in the following ways: setting a threshold according to the result of the activation function, and then binarizing the threshold, to accomplish the threshold segmentation. Where, the binarized threshold may be obtained by means of, such as, k-means cluster method, etc.

When the location of the positive sample in the navigation image, for example, may be determined by determining a location (an image region) which is higher than the threshold as the location of the positive sample, according to the result of binarization.

In the present step, an image region is cut out according to the location of the positive sample in the navigation image, so as to construct a training set.

S116: the navigation image is cut out by taking the location of positive sample in the navigation image as a center point, to obtain the training set of positive samples, and an image of the a region which does not include slices peripheral to the location of the positive sample in the navigation image is collected, to obtain a training set of negative samples.

Further, the training set of negative samples may particularly be obtained by: applying rotation, random noise superimposition, blur and gamma transform to the image of the region which does not include slices peripheral to the location of the positive samples in the navigation image, to obtain the training set of negative samples.

In the present step, samples of the training set are updated according to the location of the positive sample in the navigation image.

Where, for example, an image of N×N (pixel unit) may be cut out as the training set of the positive samples.

The processes of rotation, random noise superimposition, blur (Gaussian blur), and Gamma transform are processes of sample gaining, which is for the purpose of preventing the problem of over-fitting caused by training.

S117: the training set of positive samples and the training set of negative samples are normalized, and a HOG characteristic.

In practical applications, an HOG characteristic vector of $N_v$ dimensions may be used, where comparatively better, $N_v$=8100.

In the present step, the HOG characteristic is utilized to train an SVM classifier.

S118: an SVM classifier is utilized to detect the navigation image, and a location of the sample slice is obtained.

For example, a trained SVM classifier may be used, and a sliding window of N×N (pixel unit) may be adopted to automatically detect the entire navigation image, so as to obtain the location of the sample slice.

S119: the minimum enclosing rectangle obtained in step S113 is merged with the location of the sample slice, to accomplish identifying and labeling of the sample of the sequential slices.

In practical applications, the situation of missed detection may occur, however, the missed slices are not entirely consistent, hence, the accuracy of the detection may be improved by adopting the method of merging.

Preferably, a step S119a is executed after step S119.

S119a: correctness of a result of merging is confirmed artificially, and a detection result of the automatically identification of the navigation image is output.

S120: the sample of the sequential slice is placed in the microscope, a coordinate transformation matrix for an actual navigation image-microscope sampling space coordinate is established, and a random pixel point in the navigation image is navigated and located to the center of the microscope's visual field.

In particular, in present step, the following steps are further executed:

S121: any three points in the navigation image that are not on the same straight line is selected, and locations of pixel coordinate of the three points in the navigation image are recorded.

S122: position of the carrier rack of the microscope when the three points are in the center of imaging is determined.

The present step may be determined by observing under the microscope.

S123: Based on the result of step S121 and step S122, a coordinate transformation matrix for an actual navigation image-microscope sampling space coordinate is established, according to a method for affine transformation of space coordinates.

S124: by utilizing the coordinate transformation matrix, a random pixel point in the navigation image is projected onto a corresponding position in the visual field of the microscope, so as to locate any pixel point of the navigation image to the center of the microscope's visual field.

As an example, it's supposed that: the selected three random points in the navigation image that is not on the same straight line are: P1, P2, and P3, the pixel coordinate locations of the three points in the navigation image are denoted in a vector as A(a1, a2, a3), where a1(w1,h1). The position of the microscope's carrier rack at the time the three points are in the center of imaging is denoted as B(b1,b2,b3), wherein b1(x1,y1).

Step A: by utilizing the following equation, the coordinate transformation matrix is solved:

$$B = M \cdot A$$

Where, M represents a coordinate transform matrix.

Step B: the following equation is solved:

$$b = M \cdot a$$

Where, a represents a random pixel point in the navigation image; b represents a position corresponding to a in the visual field of the microscope.

The above equation is solved with the following formula:

$$S_i = \|(\mu_i, \sigma_i) - (\mu_1, \sigma_1)\|$$

Since $S_i = \|(\mu_i, \sigma_i) - (\mu_1, \sigma_1)\|$ is a system of linear equations in three variables, at least three coordinate points that are not on the same straight line are required for solving the coefficient of M.

Step C: by using the displacement command in the automatic control interface of the microscope, locating each of the sample slices based on clicking on the navigation image is accomplished.

S130: a sample of sequential slices is located, to bind the sample acquisition parameters.

In order to guarantee the sequence of automatic image acquisition, a database table may be established for each batch of samples, related parameters are stored in accordance with the sequence of slice collection. All of the samples are integrally scanned all over in sequence via quickly scanning under a low resolution, to accomplish binding for the sample collection parameters, and the acquired parameters are stored, so as to accomplish binding for the location, the azimuth angle, and the clarified imaging parameters for each sample.

In particular, in the present step, the following steps are further executed:

S131: clarified imaging parameters are set up under a high resolution, and a clarified imaging image that has been Gauss blurred under a low resolution is used as a sample template, and a sample database is established based on the clarified imaging parameters under a low resolution and the sample templates.

The automatic acquisition for successive slices is a long-time process of acquisition, the duration of which may be as long as several days or weeks; the first sample is taken as a fundamental initialized sample, a high resolution image is recorded and photographed, since continuity is in the state of a slice which is between successive slices, the variation of state is relatively small; however, there are still slight differences, and because of this, when a subsequent sample is collected, trimming is required on the basis of the microscopic state parameters of a previous sample.

In a particular implementation, a first point of the successive sequential samples may be taken as a fundamental initialized point, the clarified imaging parameters are adjusted and set up under a high resolution, and are stored into a table of a sample database. Herein, the high resolution may be set up according to the requirement of imaging, which is generally set up to more than 2000 multiples. Clarified refers to that edges in the image are clear.

A random integral sample is set as a matching template, a clarified imaging image under low resolution, after been Gauss blurred, is saved as a sample template (i.e., a sample template of slices) and is stored into a table of the sample database along with the imaging parameters.

Herein, a low resolution may be the case of a magnifying multiple being from 70 to 150. The sample template may be construed as a breviary picture of a sample under low resolution.

The location of the sample recorded previously is identified in the navigation image, however, in the electron microscope, there may be a deviation in the location of the sample, which results in the sample not being in the exact center position of the microscope's visual field, therefore, a method for rotating the template to match is required to be utilized to move the sample onto the same location that the sample template has been imaged. Where, the resolution of the sample template may be set to 512, 1024, or 2048. The scan resolution may be set to 2 times of the resolution of the sample template.

In a particular implementation, the following equation may be discretized, to implement Gauss blur:

$$G(x, y) = \frac{1}{2\pi\sigma^2} e^{-(x^2+y^2)/2\sigma^2}$$

Where, G represents a parameter of Gauss distribution; x, y represent the horizontal and vertical coordinates of a pixel.

Preferably, the width of the Gauss convolution kernel (isotropy) is 27.

S132: the microscope is navigated to a corresponding sample point in sequence, and the sample acquisition parameters is bound in conjunction with the sample template.

In the present step the microscope may be navigated onto the corresponding sample point in sequence in accordance with the sequence of tables in the sample database, and parameters are bound.

In particular, in the present step, the following steps are further executed:

S1321: a location of a center point of a multi-dimensional, multi-perspective template matching is determined and stored in the sample database.

In particular, in the present step, the following steps may further be executed:

S13211: an image pyramids for the sample template and a scan image to be searched is calculated.

Where, the scan image to be searched is other image regions comprising slices on the navigation image.

Since the microscopic image is considerably large, if the best point of multi-perspective matching (i.e., the best matched point) is calculated directly, it will be extremely time consuming, therefore, the embodiment of the present application adopts a strategy of the image pyramid. In an image pyramid, each level is a downsample of the level below it (preferably, the length and width are both half-sized).

In the embodiment of the application, a method of recursive downsample may be utilized to establish the image pyramids for the template image and the scan image to be searched.

In an particular implementation, the recursive downsample may be executed according to the following equation, and the image pyramids for the template image and the scan image to be searched may be calculated, until the minimum side of the image is less than 64:

$$\text{Img}_{n+1} = f_{downsample}(\text{Img}_n), n>0$$

$$l = \text{Min}(m,n) | \text{Max}(W(\text{ImgMod}_m), H(\text{ImgMod}_m))$$

$$\leq 64, \text{Max}(W(\text{ImgObs}_n), H(\text{ImgObs}_n)) \leq 64)$$

Where, $f_{downsample}(\text{Img}_n)$ represents a recursive downsample; ImgMod represents a sample template; ImgObs represents a scan image to be searched; $W(\text{ImgMod}_m)$ represents a width of the sample template; $H(\text{ImgMod}_m)$ represents a height of the sample template; $W(\text{ImgObs}_n)$ represents a width of the scan image to be searched; $H(\text{ImgObs}_n)$ represents a height of the scan image to be searched; m represents a pyramid's level number of the sample template; n represents a pyramid's level number of the scan image to be searched; l represents the final number of levels of the image pyramid generated for the two images, the sample template and the scan image, to be searched. n=0 represents the original image of the bottom level of the pyramid.

S13212: a range of rotation angle, a coarse angle and the interval thereof, and a fine angle and the interval thereof are set up.

In the present step, the range of rotation angle $\text{Agl}_t$, the interval of coarse angle $\text{Agl}_C$, and the interval of fine angle $\text{Agl}_F$ are initialized. Where, $\text{Agl}_t$ represents an absolute value of a preset range of angle matched with the slice sample template, where, preferably, $\text{Agl}_t$ is 90°. The interval of coarse angle may be set as an angle range of 180 degrees, where, preferably, $\text{Agl}_C$ is 10°. The result of dividing the interval of coarse angle is a coarse angle $\theta_i$, where i=1, 2 ... N, N being a positive integer number. The interval of fine angle preferably is 1°. The result of dividing the interval of fine angle is a fine angle $\sigma_j$, where i=1, 2 ... M, M being a positive integer number. The result of dividing the range of rotation angle is $\theta_i \pm \alpha_j$.

S13213: the scan image to be searched is rotated with a coarse angle and a fine angle, and specific to the top level of image pyramid, a normalized mutual correlation computation is executed for the rotated image and the sample template, to determine the best point for matching.

In the present step, it's started to match the template from the top level of the image pyramid, the normalized mutual correlation computation is executed, so that the best matched location (best matched point) of the present level may be obtained.

In particular, in the present step, the following steps may be executed:

SA1: the scan image to be searched ImgObs is rotated in sequence with a coarse angle of $\theta_i$, to obtain a $\text{ImgObs}_{\theta_i}$.

SA2: In accordance with the following equation, a normalized mutual correlation computation is executed for the ImgObs$_{\theta_j}$ and the sample template, to obtain a probability graph of matching degree:

$$R(x, y) = \frac{\sum_{x',y'} Img_T(x', y') \cdot Img_I(x + x', x + y')}{\sqrt{\sum_{x',y'} Img_T(x', y')^2 \cdot E_{x',y'} Img_I(x + x', y + y')^2}}$$

In this equation, x,y represent a pixel coordinate in the searched image; R(x, y) represents a value of a matrix R at the point (x, y), that is, the coordinate location of the template image; x', y' represents the a coordinate of a pixel in the sample template; $Img_T$ represents the sample templates ImgMod; $Img_1$ represents ImgObs$_{\theta_j}$.

SA3: a matched point in the image with a rotation angle of $\theta_C$ where the maximum value in the probability graph of matching degree present is selected as a best point of match (also referred to as the best matched point). Where, $\theta_C$ represents a coarse angle, 1≤c≤N, where N is a positive integer.

The process of obtaining a best point of match is elaborated below with one preferred embodiment.

SB1: a result of a coarse matched location is determining, according to the following equation:

$P(i_{max}, j_{max})_{l,\theta_C}|R(p(i,j))=\text{Max}R(x_i,y_j)$

Where, $p(i_{max}, j_{max})_{l,\theta_C}$ represents the best point of match in the topmost level of a pyramid; R(p(i, j)) represents a matrix R of the matched point p(i, j); R($x_i$, $y_j$) represents a matrix R of a pixel point ($x_i$, $y_j$); 0≤i≤W(R), 0≤j≤H(R), 1≤c≤N. Where, W(R) represents a width of the matrix R; H(R) represents the height of the matrix R, where N is a positive integer.

SB2: the scan image to be searched is rotated in sequence with an angle of $\theta_C \pm \alpha_j$, j=1, 2 ... M.

SB3: a normalized mutual correlation computation is executed for the scan image to be searched and the sample template.

SB4: the matched point in the image with a rotation angle of $\theta_C + \alpha_F$, where the maximum value in all of single images with the best result of match degree is, is selected as the best point of match $p(i_{max}, j_{max})_{l,\theta_C + \alpha_F}$.

Where, $\alpha_F$ represents a fine angle, 1<F<M.

S13214: by using the point in the present layer corresponding to the best point of match in the upper layer as a center of one sub-region, the normalized mutual correlation computation is executed for the rotated image and the sample template, the best point of match in the bottommost layer of the image pyramid is determined as a location of the center point of a multi-dimensional, multi-perspective template matching.

When the template matching is performed, starting from the top layer, the point in the present layer corresponding to the best point of match in the upper layer is used as the center of one sub-region (which may be a rectangular sub-image, with a length of length=2×Max(W(ImgMod$_{lp}$), H(ImgMod$_{lp}$), where W(ImgMod$_{lp}$) represents a width of the template image, H(ImgMod$_{lp}$) represents a height of the template image, 1−1≥lp≤0, if the boundary is overpassed, then the sliding window will automatically translate to the inner side of the boundary), a normalized mutual correlation computation is executed, and the best matched location in the present layer is obtained. By that analogy, the best matched location in the bottommost layer of the image pyramid is obtained at last. By establishing an image pyramid, the operation of template matching is accelerated, and the efficiency may be improved one to two orders of magnitude.

S1322: the center of the microscope's visual field is moved to the location of the sample of the sequential slice in the coordinate system of the microscope, and the photographed image is quickly scanned, and a Newton quadratic interpolation is used for the scanned photographed image to approach the local optimal value of the image quality, to obtain a clarified imaging parameter approximating to a present parameter.

In particular, in the present step, the following steps may be executed:

S13221: by utilizing a discretized Gauss convolution kernel to convolve the scanned photographed image, an output image is obtained.

The scanned photographed image may be any one of regions being required for acquisition in the navigation image, which may be acquired in real time.

The convolution calculation may be executed for the image to be detected, according to the discretized Gauss convolution kernal of the following equation:

$$G(x, y) = \frac{1}{2\pi\sigma^2} e^{-(x^2+y^2)/2\sigma^2}$$

Where x, y represents a coordinate of a pixel; σ represents a Gauss distribution parameter. ln is used to represent a bi-directional isotropic side length of Gauss convolution kernel, wherein ln is an odd number, which preferably is 3.

S13222: a Gauss differential computation is executed for the output image.

In particular, in the present step, the Gauss differential computation may be executed according to the following Gauss differential operator:

$DoG_{ln,dln}(\text{Img})=\text{ABS}(G_{ln}(\text{Img}))-G_{ln+dln}(\text{Img}))$ Where, ln is an odd number, which preferably is 3; dln is an even number that is greater than 0, which preferably is 64; $DoG_{ln,dln}(\text{Img})$ represents executing a Gauss differential computation; ABS(•) represents deriving an absolute value of an image; $G_{ln+dln}(\text{Img})$ represents Gauss images with different degree of blur; $G_{ln}(\text{Img})$ represents an output image obtained in step S13221.

S13223: a mean convolution kernel is convolved with the result of a Gauss differential computation, a convolution result is obtained.

For example: a mean convolution kernel $E_{nc}$ of nc×nc (preferably, nc is 5) may be used to be convolved with $\text{Img}_{DoG}$. Where, $\text{Img}_{DoG}$ represents the result of a Gauss differential computation.

S13224: threshold cutoff is applied to the convolution result, to obtain a cutoff result.

As an example, the cutoff may be performed according to the following equation:

$\text{Img}_{conv}(i,j)=0|\text{Img}_{conv}(i,j)<Th_{thresh}$

Where, $\text{Img}_{conv}(i,j)$ represents a location of a certain pixel on the convolution result (a convolution image); $Th_{thresh}$ represents a cutoff threshold.

the cutoff threshold is calculated according to the following equation:

$Th_{thresh}=\text{Sum}(\text{Img}_{conv})/\text{num}$

Where, Sum($Img_{conv}$) represents a summation of pixel values of the image; num represents a statistic number of nonzero points; $Img_{conv}$ represents a convolution result of convolving the mean convolution kernel with the result of Gauss differential computation; $Th_{thresh}$ represents a cutoff threshold.

S13225: Based on the cutoff result, an evaluation value of image quality is calculated according to the following equation:

$$Value = \frac{Sum(Img_{th})}{W(Img_{th}) \times H(Img_{th})}$$

Where, Value represents an evaluation value of image quality; $Img_{th}$ represents a cutoff result; Sum($Img_{th}$) represents a summation of pixels of the cutoff result; W($Img_{th}$) represents a width of the cutoff result; H($Img_{th}$) represents a height of the cutoff result.

S13226: by taking the evaluation value of image quality as a relative calculated value of the clearness under the present scan parameters, a clarified imaging parameter gradually approximate to the present parameters is obtained by employing a local optimal algorithm to approach the local optimal value.

Where, in the present step, Newton dichotomy may be employed to implement gradual approximation. For example: it's supposed that the present microscope collects the image's evaluation value Value, in the case of a state S, then the relevant parameters of the microscope is adjusted to make the microscope stay in a state Si+. Herein, the positive sign + represents an adjusting direction of the parameters. The adjusted relevant parameters of the microscope may, for example, be a focusing parameter, which may, in a practical implementation, be determined according to different microscopes, differing according to the models and manufacturers of the microscopes. After the adjustment, a Valuei+ is obtained, if Valuei+>Value, then Valuei+ is set to Value, and the process is repeated until it is less than Value, (Value+ Valuei+)/2 is used as a new Value, until the interval between the new Value and the previous Value is less than a threshold θ, which also needs to be determined according to the particular model of the microscope.

S1323: based on the location of the center point of the multi-dimensional, multi-perspective template matching, parameter binding for the clarified imaging parameters is executed.

The clarified imaging parameters (sample acquisition parameters) is stored into a table of sample database, and parameter binding for all of the samples in the sample database is executed.

S140: based on the binded of sample acquisition parameters, a relationship of a relative position between the center point of the high resolution acquisition region and the center point of matched sample template is recorded.

The high resolution acquisition region may be initialized prior to this step. During acquiring, first, the center of the sample template is found, and then moved to an interested region according to the above relationship of the relative position.

S150: a successive image acquisition for a sample point is executed, in conjunction with the sample acquisition parameters and the relationship of relative position.

In the present step, a navigation locating for sample point is executed, a target area is fine located, the clearness of acquired image is a real-time adjusted, and sub-images of large region are successively acquired, in conjunction with the sample acquisition parameters.

In particular, in the present step, the following steps may further be executed:

S151: the sample acquisition parameters are read.

In the present step, the sample acquisition parameters bound for said sample point may be read from the bound table of sample database.

S152: the center of the microscope's visual field is moved to a location that requires for high resolution imaging, and a scan deflection angle is set.

In particular, in the present step, based on the sample template, a multi-dimensional, multi-perspective normalized mutual correlation algorithm is used to match the sample template, the location of the sample in the coordinates of microscope and the scan deflection angle between the sample and the template are located. The scan deflection angle may be a scan deflection angle of an electron beam or illuminant.

S153: imaging parameters are adjusted.

In practice, the parameters may be adjusted in accordance with the sequence of operating focus, bidirectional phase dispersion, and operating focus.

S154: a multi-region acquisition point is back calculated into the actual coordinate system of the microscope with an affine transformation matrix.

Where, the multi-region acquisition point is a corresponding interested region of each slice.

In a particular implementation, an affine transformation matrix $M_r$ may be established with a displacement of 0 and a scan deflection angle of $\theta_{c0}+\alpha_{F0}$, the multi-region acquisition point $p_i$ may be back calculated into the actual coordinate system $p_i'$ of the microscope by means of $M_r$. Where, $\theta_{c0}$ represents a coarse angle, 1<c0<N, where N is a positive integer; $\alpha_{F0}$ represents a fine angle, 1<F0<M, where M is a positive integer.

S155: the center of the microscope's visual field is moved to the actual coordinate system of the microscope, the preset high resolution image is scanned point by point, to accomplish multi-region image acquisition for a sample point.

For example: the center of the microscope's visual field is moved to $p_i'$, the scan deflection angle is set as $\theta_{c0}+\alpha_{F0}$; the preset high resolution image is scanned point by point.

In order to acquire high quality images, an image quality evaluation is required to be executed after the acquisition, and a reacquisition is required in the case of excessively poor image quality.

S156: successive sample images are output, based on the multi-region image acquisition of various sample points.

Although various steps are described by way of the above sequence in the embodiment above, one of ordinary skill in the art may understand that, in order to achieve the effect of the present embodiment, various steps are not necessarily to be executed in such an order, instead, they may be executed simultaneously (concurrently) or be executed in a reversed order, all of these simple variations will fall within the scope of the application.

It should also be noticed that, the language used in the present description are mainly for a purpose of readability and instruction, rather than selected for explaining or limiting the subject of the application.

The present application are not limited to the embodiments above, any variations, modifications or alternations that one of ordinary skill in the art may think of will fall within the scope of the application, without departing from the substance content of the application.

What is claimed is:

1. A method for microscopic image acquisition based on a sequential slice, comprising:
   acquiring a sample of a sequential slice and a navigation image thereof;
   identifying and labeling the sample of the sequential slice in the navigation image by utilizing methods of image processing and machine learning;
   placing the sample of the sequential slice in a microscope, establishing a coordinate transformation matrix for a navigation image-microscope actual sampling space coordinate, navigating and locating a random pixel point in the navigation image to a center of the microscope's visual field;
   locating the sample of the sequential slice under a low resolution visual field, and binding a sample acquisition parameter;
   based on the binding of the sample acquisition parameter, recording a relative relationship of locations between a center point of a high resolution acquisition region and a center point after being matched with a sample template;
   executing successive acquisition for images of sample points, in conjunction with the sample acquisition parameter and the relative relationship of the locations.

2. The method according to claim 1, wherein, the identifying and labeling the sample of the sequential slice in the navigation image by utilizing methods of image processing and machine learning, particularly comprise:
   segmenting the navigation image by using a Mean-Shift algorithm, to obtain a foreground sample target region and a background region;
   calculating a minimum enclosing rectangle of an outline of an edge of the foreground sample target region and the background region;
   comparing the minimum enclosing rectangle of the outlines of the edge of the foreground sample target region and the background region with a minimum enclosing rectangle of the sample template, filtering out a foreground sample target region and the background region where a disparity of a width to length ratio and an area size are relatively large;
   determining the following activation function:

$$y = e^{-\left(\frac{S_i^2}{W} + \frac{S_\sigma^2}{B_i^2}\right)}$$

wherein, the y represents an activation function; the $S_i$ represents an Euclidean distance of a characteristic value of a sliding window region, where the $S_i = \|(\mu_i, \sigma_i) - (\mu_1, \sigma_1)\|$; the $B_i$ represents an Euclidean distance of a characteristic value of a sample, where the $B_i = \|(\mu_i, \sigma_i) - (\mu_2, \sigma_2)\|$; the $\mu_1$ represents a mean value of a sample target region; the $\sigma_1$ represents a variance of the sample target region; the $\mu_2$ represents a mean value of a non-sample background region; the $\sigma_2$ represents a variance of the non-sample background region; the $\mu_i$ represents a mean value of the sliding window region; the $\sigma_i$ represents a variance in the sliding window region; the W represents a weight;
   executing a threshold segmentation for a result of the activation function, to determine a location of a positive sample in the navigation image;
   cutting out the navigation image by taking the location of the positive sample in the navigation image as a center point, to obtain a training set of the positive sample, and acquiring an image of a region which does not include a slice peripheral to a location of the positive sample in the navigation image, to obtain a training set of a negative sample;
   normalizing the training set of the positive sample and the training set of the negative sample, and extracting a HOG characteristic;
   utilizing an SVM classifier to detect the navigation image, and obtaining a location of the sample slice;
   merging the minimum enclosing rectangle obtained by cutting out with the location of the sample slice, to accomplish identifying and labeling of the sample of the sequential slice.

3. The method according to claim 2, wherein, the acquiring an image of a region which does not include a slice peripheral to a location of the positive sample in the navigation image, to obtain a training set of a negative sample, particularly comprises:
   applying rotation, random noise superimposition, blur and gamma transform to the image of the region which does not include the slice peripheral to the location of the positive samples in the navigation image, to obtain the training set of the negative sample.

4. The method according to claim 1, wherein, the placing the sample of the sequential slice in the microscope, establishing a coordinate transformation matrix for the navigation image-microscope actually sampling space coordinate, navigating and locating a random pixel point in the navigation image to the center of the microscope's visual field, particularly comprises:
   selecting any three points in the navigation image that are not on a same straight line, and recording a location of pixel coordinate of the three points in the navigation image;
   determining a position of a carrier rack of the microscope when the three points are in a center of imaging;
   based on the location of pixel coordinates of the three points in the navigation image and the position of the carrier rack of the microscope when the three points are in the center of imaging, establishing a coordinate transformation matrix for the navigation image-microscope actually sampling space coordinate, according to a method for affine transformation of space coordinates;
   utilizing the coordinate transformation matrix, to project a random pixel point in the navigation image onto a corresponding position in the visual field of the microscope, so as to locate a random pixel point of the navigation image to a center of the microscope's visual field.

5. The method according to claim 1, wherein, locating the sample of the sequential slice under a low resolution visual field, and binding a sample acquisition parameter, particularly comprises:
   setting up a clarified imaging parameter under a high resolution, and taking a clarified imaging image under a low resolution that has been Gauss blurred as a sample template, and establishing a sample database based on a clarified imaging parameter under a low resolution and the sample template;
   navigating the microscope to a corresponding sample point in sequence, and binding a sample acquisition parameter in conjunction with the sample database.

6. The method according to claim 5, wherein, the navigating the microscope to a corresponding sample point in sequence, and binding a sample acquisition parameter in conjunction with the sample database, particularly comprises:

determining a location of a center point of a multi-dimensional, the multi-perspective template matching, and storing the location of the center point of the multi-dimensional, multi-perspective template matching into the sample database;

moving the center of the microscope's visual field to a location of a sample of the sequential slice in the coordinate system of the microscope, and quickly scanning a photographed image, and using a Newton quadratic interpolation to approach a local optimal value of a image quality for the scanned photographed image, to obtain a clarified imaging parameter approximating to a present parameter;

executing parameter binding for the clarified imaging parameter, based on the sample database.

7. The method according to claim 6, wherein, the determining a location of a center point of a multi-dimensional, multi-perspective template matching, particularly comprises:

calculating a image pyramids for the sample template and a scan image to be searched;

setting up a range of a rotation angle, a coarse angle and an interval of the coarse angle, and a fine angle and an interval of the fine angle;

rotating the scan image to be searched with the coarse angle and the fine angle, and specific to a top level of the image pyramid, executing a normalized mutual correlation computation for a rotated image and the sample template, to determine the best point of match;

taking a point in a present layer corresponding to the best point of match in an upper layer as a center of one sub-region, executing the normalized mutual correlation computation for the rotated image and the sample template, determining the best point of match in a bottommost layer of the image pyramid as a location of the center point of the multi-dimensional, multi-perspective template matching.

8. The method according to claim 6, wherein, the obtaining a clarified imaging parameter approximating to a present parameter, particularly comprises:

utilizing a discretized Gauss convolution kernel to convolve the scanned photographed image, to obtain an output image;

executing a Gauss differential computation for the output image;

convolving a mean convolution kernel with a result of the Gauss differential computation, to obtain a convolution result;

applying threshold cutoff to the convolution result, to obtain a cutoff result;

based on the cutoff result, calculating an evaluation value of image quality according to the following equation:

$$\text{Value} = \frac{\text{Sum}(Img_{th})}{W(Img_{th}) \times H(Img_{th})}$$

wherein, the Value represents a evaluation value of image quality; the $Img_{th}$ represents a cutoff result; the $\text{Sum}(Img_{th})$ represents a summation of pixels of the cutoff result; the $W(Img_{th})$ represents a width of the cutoff result; the $H(Img_{th})$ represents a height of the cutoff result;

taking the evaluation value of image quality as a relative calculated value of a clearness under a present scan parameters, and employing a local optimal algorithm to approach the local optimal value, to obtain the clarified imaging parameter gradually approximate to the present parameters.

9. The method according to claim 1, wherein, the executing successive acquisition for images of sample point, in conjunction with the sample acquisition parameter and the relative relationship of the locations, particularly comprises:

reading a sample acquisition parameter;

moving the center of the microscope's visual field to a location that requires for high resolution imaging, and setting a scan deflection angle;

adjusting a imaging parameter;

back calculating multi-region acquisition points into the actual coordinate system of the microscope with an affine transformation matrix;

moving the center of the microscope's visual field to the actual coordinate system of the microscope, scanning a preset high resolution image point by point, to accomplish multi-region image acquisition for sample points;

outputting successive sample images, based on the multi-region image acquisition of each of the sample points.

* * * * *